Feb. 10, 1970   R. F. ARNOLDY   3,494,749
ABRASION RESISTANT PLATE
Original Filed Dec. 9, 1966   2 Sheets-Sheet 1
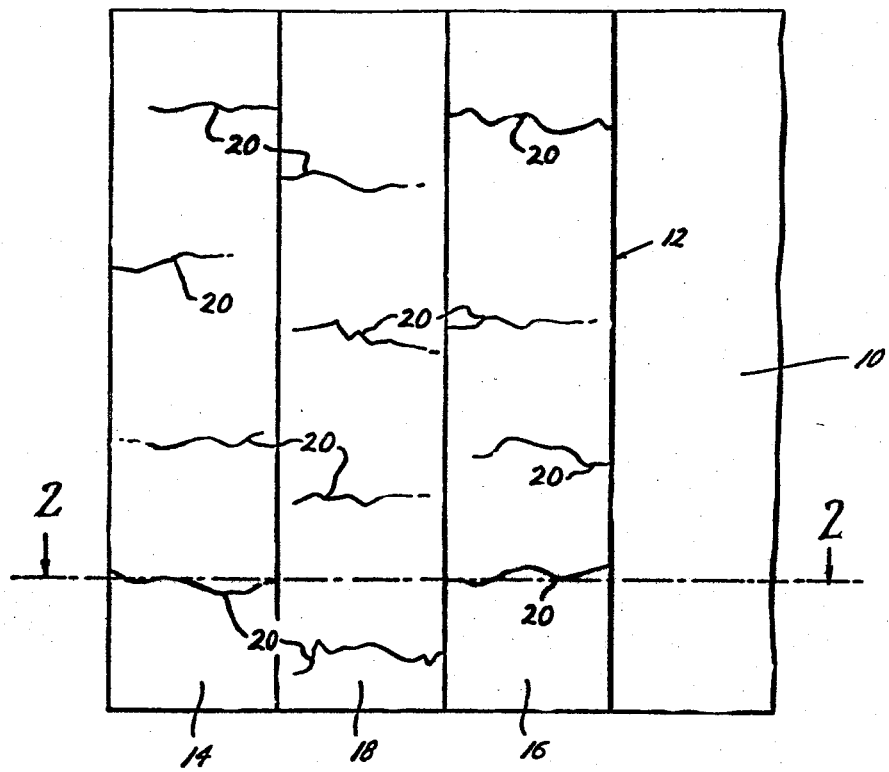
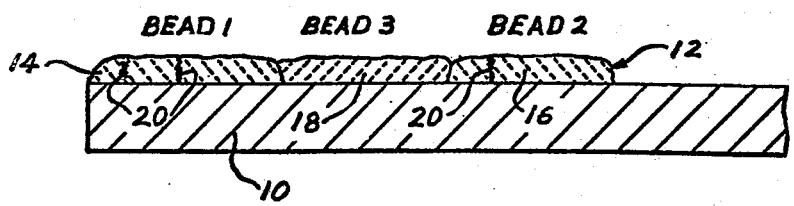
Roman F. Arnoldy
INVENTOR.
BY James F. Weiler
William A. Stout
Paul L. DeVerter II
Dudley R. Dobie, Jr.
ATTORNEYS Feb. 10, 1970  R. F. ARNOLDY  3,494,749
ABRASION RESISTANT PLATE
Original Filed Dec. 9, 1966  2 Sheets-Sheet 2
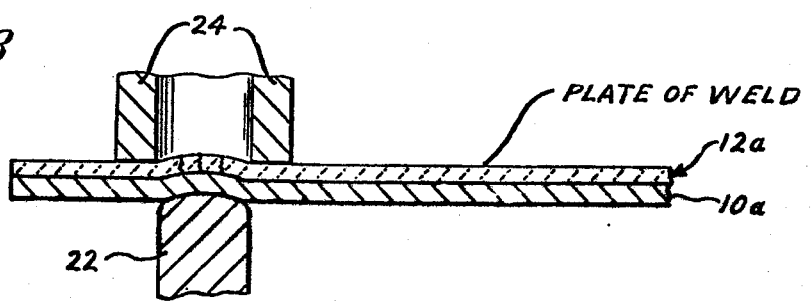
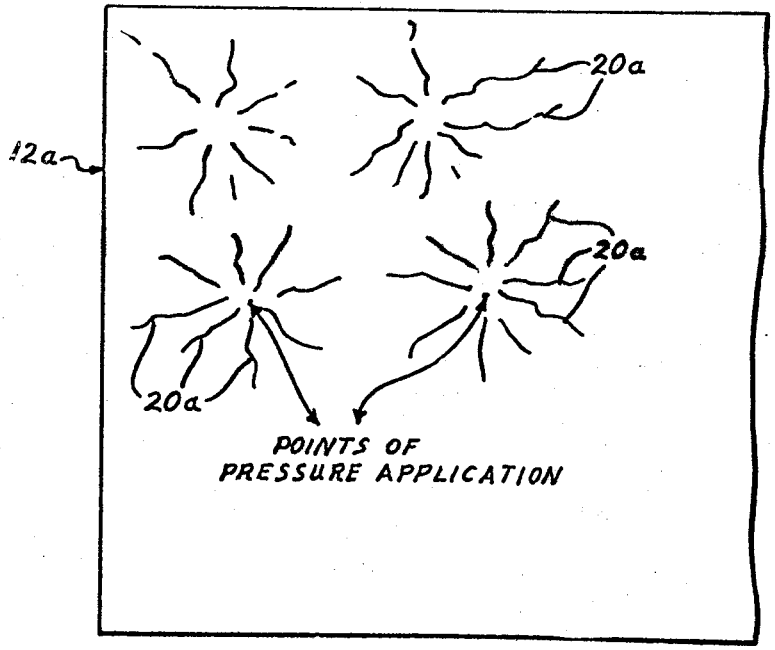
Roman F. Arnoldy
INVENTOR.

3,494,749
ABRASION RESISTANT PLATE
Roman F. Arnoldy, P.O. Box 19527,
Houston, Tex. 77055
Application Dec. 9, 1966, Ser. No. 600,572, which is a continuation-in-part of application Ser. No. 353,510, Mar. 20, 1964. Divided and this application Aug. 2, 1967, Ser. No. 668,980
Int. Cl. B23p 17/04
U.S. Cl. 29—196.1
2 Claims

ABSTRACT OF THE DISCLOSURE

The abrasion resistant plate is a composite having a very high abrasion resistant layer on a malleable base, the high abrasion resistant layer having a desired pattern of random, generally nonlinear cracks extending to and generally normal to the base surface with a crack frequency of no more than about three inches and preferably of about 5/8 inch to about 3/4 inch. One method of making it comprises applying to the base a first and second bead spaced apart the width of the bead and then a third bead in the space between them, the composition of the beads being such that shrinkage stress from welding causes pulling apart of the beads at intervals within the range of cracking. This method avoids the cracks from being oriented and forms the desired random crack pattern. Other methods of making the composite plate are mechanical. The desired pattern is formed by subjecting the base and an abrasion resistant layer to a punch and die, which causes mainly radial cracking within the desired crack pattern. The desired crack pattern is also formed by providing the desired pattern on the base surface which causes cracks to form in the layer of abrasion material in generally the same pattern when applied to the base.

---

The present application is a division of application Ser. No. 600,572, filed Dec. 9, 1966, now abandoned which is a continuation in part of application Ser. No. 353,510, filed Mar. 20, 1964, now abandoned.

The present invention relates to abrasion resistant plates and methods of producing them and surfacing objects, and more particularly relates to such abrasion resistant plates and methods in which the plate has a relatively ductile and weldable base and a very high abrasion resistant surface layer bonded to it, the abrasion resistant layer having a pattern of random, generally non-linear cracks in a frequency of not more than about three inches, the cracks extending to and generally normal to the base. Such a composite plate may be rolled, forged, punched, sheared, welded, cut, shaped and formed into a variety of forms and shapes to fit the surface to be hard faced or provided with an abrasion resistant surface and then secured to the surface and may be repaired without essential damage.

Resistance to abrasion on metal parts is accomplished at present in a number of ways. One is an abrasion resistant plate which is a type of steel plate which contains small quantities up to about three percent of alloying elements which form some carbides and which harden by lattice structure or cold working to increase resistance to abrasion generally and in amounts up to perhaps 50%. The quantities of structure hardening or carbide forming elements must be small so that the plate will not be brittle and break in handling or in cutting, welding or forming. Hardnesses in this type of abrasion resistant plate range up to about 300 BHN, and any carbides present range under about 5%.

Another abrasion resistant plate is the heat treatable, high carbon or alloy plate which usually contains up to about 5% alloys. This type of plate is made to resist abrasions by various types of heat treatment. For example, it may be through heat treated and drawn to an intermediate hardness up to about 350 BHN. A higher hardness causes brittleness, breakage or non-weldability of the plate and the plate still does not contain enough carbides to give high abrasion resistance. A plate of this type has abrasion resistance improvement to perhaps 100%.

Another type of heat treatment of the heat treatable high carbon, or alloy plate is that it may be carburized cyanided, nitrided or flame hardened to hardness up to 650 BHN to improve abrasion resistance while allowing some shock resistance. However, it is not formable, cuttable or weldable without damage and does not contain sufficient carbides to have great abrasion resistance, the carbide content of this type of plate ranging under 5% and the abrasion resistance improvement being up to perhaps 150%.

Yet a further resistance to abrasion on metal parts is accomplished at the present by hard metal castings. These are hard as cast materials and usually contain significant quantities of carbon and alloying metals. In the most common and most economic type, however, the chromium ranges up to about 27% and the carbon not over 2.7%. A carbon content above about 2.7% is too brittle and the casting is subject to breakage even in the mold and cannot be used satisfactorily. The hard metal casting may contain up to about 25% chromium carbides and has high abrasion resistance. The product, however, cannot be formed and cannot be cut or welded on without damage. This casting cannot be repaired satisfactorily as this requires welding. It must be cast to the exact size and shape required and can only be machined and drilled with great difficulty and with the requirement of two heat treatments.

Still a further way in which metal parts are made resistant to abrasion at the present time is by hard facing. In hard facing any weldable desired abrasion resistant alloy may be applied by welding with carbide content ranging up to the order of 40% to give the abrasion resistance of true hard facings. The deposit of hard facing, however, requires much time and expensive welding materials and makes this method advisable in only limited areas where abrasion is most severe. The welding needs to be manual or semi-automatic and trimming and grinding of the deposit is required if the deposit is made in place. A skilled welder is required to be present to make the deposition and the cost per square inch is quite high.

It would be advantageous to provide an abrasion resistant or a hard surfacing metal plate and an economical and relatively simple method of forming them, in which the abrasion resisting plates can be stocked as a standard size plate at a warehouse, they may be cut readily into pieces of any size or shape by conventional available equipment, such as plasma or arc-air cutting equipment, and can be bent or formed to fit the surface to be hard faced and welded in place as a unit, which does not need dressing and which is relatively low in cost of manufacture and application.

In the past it has been believed to be a disadvantage for a layer of high abrasion resistant material to have cracks. When the cracks are in a regular pattern or in relatively straight lines, planes of weakness to bending, forming, rolling or otherwise working these plates are formed. Also, when the cracks are too far apart, the accumulated shrinkage stress between these cracks is great enough to allow progression through the plate and cause structural destruction. For example when cracks are over about three inches apart sufficient shrinkage stress is present in each so that the cracks can progress into the plate.

The present invention is based upon the discovery that by providing an abrasion resistant plate having a malleable base and an abrasion resistant layer with cracks extending to and generally normal to the base surface in a frequent, random and generally nonlinear pattern and in which the cracks are spaced no more than about three inches apart, an abrasion resistant or hard surfacing metal plate is provided which may be rolled, forged, punched, sheared or otherwise worked, welded, which may be cut readily into pieces of any size or shape by conventional available equipment such as plasma or arc-air cutting equipment, and can be bent or formed to fit the surface to be hard faced or welded in place as a unit without essential damage.

It is therefore an object of the present invention to provide an abrasion resistant plate and methods of manufacture thereof which are relatively inexpensive.

Yet a further object of the present invention is the provision of an abrasion resisting plate and methods of forming it which has high abrasion resistance, which is extremely hard, yet which may be readily cut to any desired size or shape, bent or formed to fit a surface to be made abrasion resistant and which may be welded or otherwise secured in place to provide a relatively inexpensive and very effective abrasion resistant or hard faced surface.

A further object of the present invention is the provision of an abrasion resistant plate or a hard surface plate and methods of manufacturing them which may readily and easily be cut to any size or shape, which may be bent or formed to fit a metal surface subject to abrasion and readily be welded or otherwise secured in place to provide an effectively efficient hard facing surface.

Yet a further object of the present invention is the provision of such an abrasion protection surface in the form of a dual metal plate and its method of manufacture, which may be cut, formed and welded or otherwise secured in place at relatively low cost and which is readily repairable without damage.

Yet a further object of the present invention is the provision of a composite plate having a malleable base and a very hard and/or carbide containing layer which layer has cracks spaced no further than about three inches apart in a random, generally non-linear pattern, rather than in straight lines thereby avoiding planes of weakness which occur in straight line cracks and avoiding stresses of a magnitude which would cause failure.

Yet a further object of the present invention is the provision of a composite plate having malleable and weldable base and a very hard and/or carbide containing layer which takes advantage of the cracking characteristics of the abrasion resistant layer, which heretofore was considered objectionable, but provides the cracking in a random, generally non-linear pattern in which the cracks are spaced no further than about three inches apart, and methods of manufacturing such a composite plate, and in which such composite plate may be cut, rolled, forged, punched, sheared, formed in various shapes and welded or otherwise secured in place without essential damage to the composite plate.

Other and further objects, features and advantages of the present invention will appear from the following description of presently-preferred embodiments thereof taken in conjunction with the accompanying drawings, in which like character references designate like parts throughout the several views, and where FIGURE 1 is a fragmentary view of an abrasion resistant plate according to the invention and before shaping.

FIGURE 2 is a cross sectional view of the abrasion resistant plate along the line 2—2 of FIGURE 1.

FIGURE 3 illustrates a modified method of producing an abrasion resistant plate according to the invention, and FIGURE 4 is a plan view illustrating an abrasion resistant plate formed according to the method illustrated in FIGURE 3.

Referring now to the drawings, and particularly to FIGURE 2, a suitable base plate 10 is provided which is formed of any relatively ductile, malleable and weldable material, such as the mild steels and the like, and which may be cut, bent, shaped, welded or bolted to a surface to be made abrasion resistant as may be necessary for the particular application. A layer 12 of hard facing or abrasion resistant material, for example, a very hard or a carbide containing layer or both, is provided on the base plate 10. In this embodiment, in order to control the desired spacing and random and non-linear cracking pattern of the layer 12, a first bead 14 was welded to the metal base plate 10. Then a second bead 16 was welded to the metal plate 10 along the length of and a distance from the first bead 14 so as to leave a space the width of the beads between the first bead 14 and the second bead 16. Then a third bead 18 was welded in the space between the first bead 14 and the second bead 16.

The shrinkage stress of welding each of these beads caused them to pull apart and form the cracks 20 at intervals of about ¾ inch when using the composition of Example I. The cracking, however, was random and non-linear, such as illustrated in FIGURE 1, and there was no regular, oriented or linear arrangement of the cracks 20 which would result in planes of weakness which would damage the plate or develop on bending or working the composite plate.

In commercial practice it may be desirable to weld a number of beads onto the base plate at the same time, for example, with multiple automatic deposition equipment. This may be done provided that a space is left between a row or rows of beads and then a bead or beads are welded in the space or spaces between the row or rows of beads. Each of the beads produces cracks 20, when using weldable brittle materials as herein specified, but the cracks 20 are not in alignment with each other and are in a random generally non-linear pattern and, accordingly, no weakness planes develop on bending or working these composite plates when the crack frequency is within the range of not more than about three inches between cracks.

It is necessary that the cracks 20 in the layer be spaced no more than about three inches apart. The optimum crack frequency is about ⅝" to ¾", for example, on a ⅛" nominal cladding.

With the cracks 20 formed in the abrasion resistant layer 12 in the pattern and frequency range specified, the abrasion resistant plate may be formed by bending with the cracks either facing outward or facing inward without developing weakness planes or without any essential damage to the composite plate. The bending may be by any suitable means or method, such as presses and the like, all of which are conventional and available and, accordingly, no detailed description thereof is deemed necessary or given.

With the cracks 20 within the range specified, the stress at the base of each of these cracks is not large enough to cause progression into and through the plate, when formed or cut, rolled, forged, punched, sheared, repaired or welded onto a metal surface desired to be provided with an abrasion resistant surface. While additional cracks may form when the composite plate is heated, welded or otherwise strained, the frequencies of these cracks will result in low stress in each and no failure.

Any desired abrasion resistant composition may be used for the layer 12 which has low to no ductility and low tensile strength or both so that it will crack vertically upon welding within the frequency range for the method illustrated in FIGURES 1 and 2.

Thus, in the method of forming cracks illustrated in FIGURES 1 and 2, and the composite plate produced thereby, the carbide containing alloy material or weldable brittle materials are of such an analysis that they pull themselves apart on cooling and form the cracks 20 within the range of up to about three inches between cracks, as previously mentioned. The following are typical compositions of hard facing material which will form the cracks within the range specified and provide very high resistance. In these examples all percentages are by weight.

EXAMPLE I

| | Percent |
|---|---|
| Chromium | 27 |
| Carbon | 3.5 |
| Balance | Iron |

The composition of Example I provides a surface of one of the highest abrasion resistances and a pattern of cracks 20 formed at about ¾" intervals in each bead when applied to the metal base plate 10.

EXAMPLE II

| | Percent |
|---|---|
| Chromium | 33 |
| Carbon | 3.5–4.5 |
| Balance | Iron |

The composition of this example also provides a very high abrasion resistant surface and a frequency of cracks within the range specified in each bead applied to the base plate 10.

EXAMPLE III

| | Percent |
|---|---|
| Chromium | 25–35 |
| Manganese | 0–8 |
| Carbon | 2.5–5 |
| Molybdenum | 0–2 |
| Boron (may be added) | 0–5 |
| Iron | Balance |

EXAMPLE IV

| | Percent |
|---|---|
| Carbon | 4 |
| Silicon | .8 |
| Iron (welded with chill) | Balance |

EXAMPLE V

| | Percent |
|---|---|
| Chromium | 5 |
| Carbon | 2 |
| Boron | 5 |
| Iron | Balance |

EXAMPLE VI

| | Percent |
|---|---|
| Carbon | 3.5 |
| Chromium | 18 |
| Boron | 4 |
| Nickle | Balance |

In all of Examples III through VI, cracks 20 occur within the frequency range specified in the beads applied to the weldable and ductable base plate 10 and provide a very satisfactory hard surfacing and an abrasion resistant plate which can be readily rolled, formed, forged, punched, sheared, cut, shaped, welded in place and repaired without essential damage.

EXAMPLE VII

| | Percent |
|---|---|
| Chromium | 20 |
| Carbon | 2 |
| Balance | Iron |

This is a medium analysis facing, and cracks formed in each bead about 14 inches apart on welding to a base plate. These cracks progressed through the plate and caused structural destruction of the plate. The shrinkage stress of the alloy material accumulated over a 14 inch length in each crack and was of high magnitude and progressed into the plate causing structural destruction. When the alloy content was changed to that of Example I, cracks 20 formed at the ¾" intervals in each bead and this clad piece was bent and formed to a radii of twenty times thickness without damage.

A modified method of producing a composite plate according to the invention is illustrated in FIGURES 3 and 4 in which the reference letter "a" has been added to reference numbers corresponding to those in FIGURES 1 and 2 for convenience of reference. In this embodiment, a cast hard sheet 12a braised or bonded to a wrought plate 10a is provided and the weld overlay sheet 12a is brazed or bonded to the wrought plate 10a which weld overlay sheet obtained its brittle state after treatment. The composite plate was subjected to pressure from a punch 22 and die 24 so as to cause mainly radial chacking around each spot of pressure application, as best seen in FIGURE 4. This provides a random, generally non-linear pattern of cracks 20 and 20a within the range frequency, that is not over three inches between cracks, therefore avoiding stresses of high magnitude that would progress into the base plate 10a.

Following the mechanical cracking of the composite plate by the punch 22 and die 24, the composite plate may be run through rolls for flattening and be ready for use, shaping, forming, forging, punching, shearing, welding and the like.

The random, generally non-linear cracks within the range frequency specified may be formed in any desired manner. For example, another mechanical method is by providing a desired scoring or grooves in the base plate 10, such as illustrated in my previous Patent No. 3,000,094, except that rather than a regular pattern as there disclosed, the pattern is non-regular, generally non-linear and random with the cracks spaced no more than about 3 inches apart from each other and, preferably, within the range of ⅝ inch to ¾ inch.

The abrasion resistant layer used in the mechanical methods of forming chacks may have a composition which does not crack or which cracks outside the range on welding, but must be low to no ductility or low tensile strength to crack vertically with applied stress.

The cracks 20 in the layer of abrasion resistant material 12 may therefore be formed by any desired method or means. It is essential, however, that the cracks extend through the hard facing material 12 generally normal to the surface of the base plate 10 in the pattern and range specified.

Abrasion resistant plates may be preformed and stocked in a warehouse in standard size or sizes and they may be readily cut, rolled, formed, forged, punched, sheared, shaped, and welded or otherwise secured to the surface for substituting in place of the surface to be made hard faced or made abrasion resistant plate without any need for dressing the edges.

When the abrasion resistant plate is bent, it may produce further cracking, but this does not damage the plate for abrasion resistance or strength purposes.

After long periods in surface where selective abrasion may abrade away an area, repairs may be made by manual welding without essential damage and without removing the plate from service.

The present invention, therefore, is well suited and adapted to attain the objects and ends and has the advantages and features mentioned as well as other inherent therein.

While presently-preferred embodiments of the invention have been given for the purposes of disclosure, changes may be made within the spirit of the invention as defined by the scope of the appended claims.

What is claimed is:

1. An abrasion resistant plate comprising,
   a relatively ductile, sheet-like, metal base plate, and
   a layer of a relatively brittle hard facing material
   bonded to the base plate provided with a plurality of cracks extending through the hard surface generally normal to the base plate but not into the base plate and being in a generally random and non-linear pattern at a frequency of not less than about one in each three inches;

said abrasion resistant plate having the properties of being able to be cut, rolled, forced, punched, sheared and formed in various shapes and welded without essential damage.

2. The abrasion resistant plate of claim 1 where, the base plate is formed of a metal alloy, and the frequency of the cracks is from about 5/8" to about 3/4".

References Cited

UNITED STATES PATENTS

| 2,450,007 | 9/1948 | Litton | 29—198 |
| 3,000,094 | 9/1961 | Arnoldy | 29—528 |
| 3,402,459 | 9/1968 | Arnoldy | 29—528 |
| 3,407,478 | 10/1968 | Arnoldy | 29—528 |

L. DEWAYNE RUTLEDGE, Primary Examiner

T. R. FRYE, Assistant Examiner

U.S. Cl. X.R.

29—191.6, 528

PO-1050
(5/69)

UNITED STATES PATENT OFFICE
CERTIFICATE OF CORRECTION

Patent No. 3,494,749      Dated February 10, 1970

Inventor(s) R. F. Arnoldy

It is certified that error appears in the above-identified patent and that said Letters Patent are hereby corrected as shown below:

Claim 1, line 11, "forced" should read -- forged --

SIGNED AND
SEALED
SEP 15 1970

(SEAL)
Attest:

Edward M. Fletcher, Jr.
Attesting Officer

WILLIAM E. SCHUYLER, JR.
Commissioner of Patents